Aug. 9, 1927.  
H. GLAENZER  
1,638,663  
DRIVING WHEEL FOR LOCOMOTIVES, ETC  
Filed June 22, 1927
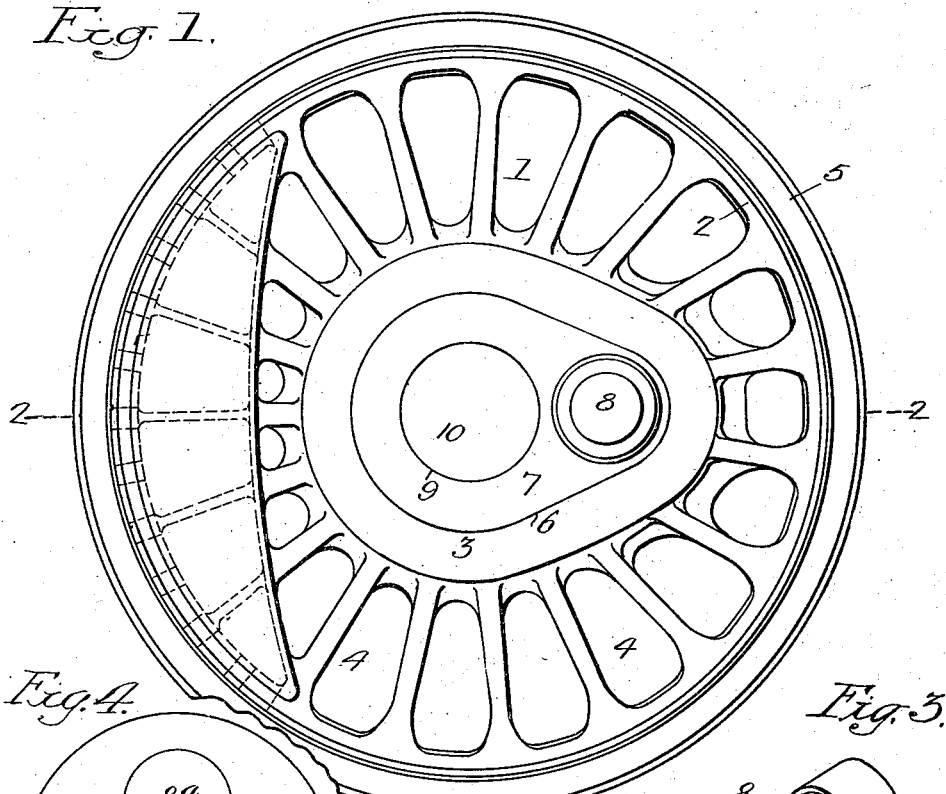
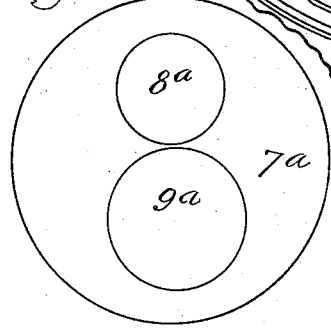
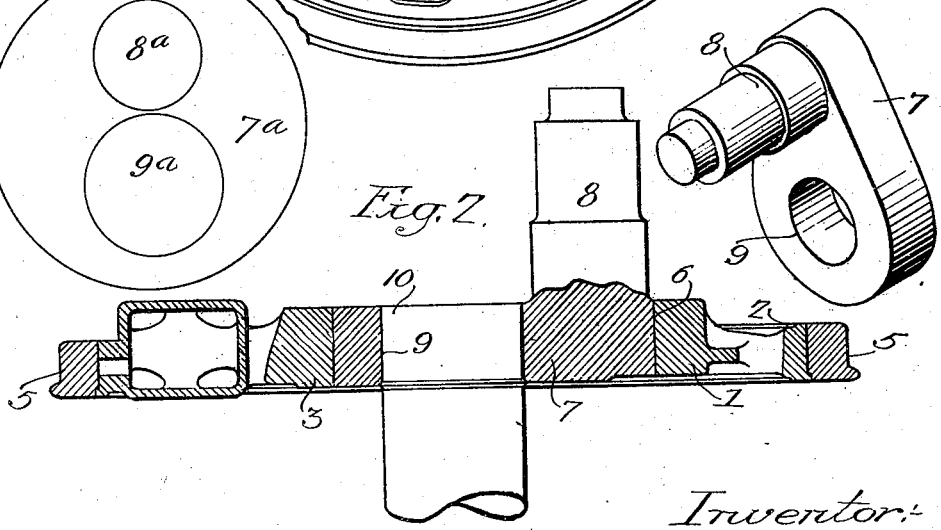
Inventor:-  
Harry Glaenzer  
by his Attorneys,  
Howson & Howson Patented Aug. 9, 1927.

1,638,663

UNITED STATES PATENT OFFICE.

HARRY GLAENZER, OF PHILADELPHIA, PENNSYLVANIA.

DRIVING WHEEL FOR LOCOMOTIVES, ETC.

Application filed June 22, 1927. Serial No. 200,688.

The object of my invention is to provide a driving wheel with a large driving pin and with an opening for an enlarged axle, without weakening the hub of the wheel. This object I attain by making the driving pin an integral part of an auxiliary hub which is driven into the main hub.

In the accompanying drawing:

Fig. 1 is a face view of a driving wheel illustrating my invention;

Fig. 2 is a sectional plan view on the line 2—2, Fig. 1;

Fig. 3 is a detached perspective view illustrating the auxiliary hub and integral driving pin; and Fig. 4 is a view illustrating a modification of the invention.

1 is the centre of a driving wheel for locomotives having a rim 2 and a hub 3 connected to the rim by spokes 4 in the present instance. On the wheel centre is the usual flanged tire 5.

In the hub 3 is an opening 6, into which is driven the supplemental or auxiliary hub 7. Forged or cast integral with this hub is the driving pin 8, as clearly shown in Figs. 2 and 3, and in this supplemental hub is an opening 9 for the axle 10. By this construction, the driving pin 6 can be increased in diameter, as well as the axle 10, without weakening the parts, as the pin is forged or cast integral with the auxiliary hub, and the opening in the hub 3 being elongated and somewhat pear-shaped in the present instance provides a substantial seat for the auxiliary hub 7 when driven into position, the peculiar shape of the parts preventing one part turning independently of the other without the use of keys or other fastenings.

In Fig. 4 I have illustrated a modification, in which the auxiliary hub 7ª is circular in form and fits a circular opening in the main hub of the wheel.

The pin 8ª is cast integral with this auxiliary hub 7ª, and in the hub is an opening 9ª for the axle. In this instance the auxiliary hub is driven in the main hub, and a key may be used if desired.

I claim:

1. The combination in a driving wheel for locomotives, etc., of a wheel centre having a hub provided with an opening; and a supplemental hub driven into the opening and having a crank pin integral therewith.

2. The combination in a driving wheel for locomotives, etc., of a wheel centre having a hub provided with an opening; an auxiliary hub driven into the opening and having a crank pin integral therewith, said auxiliary hub having an axle opening adjacent the pin; and an axle driven into said opening.

3. The combination in a driving wheel for locomotives, etc., of a wheel centre having a hub and an elongated opening therein; a supplemental hub shaped to correspond with the opening in the main hub and driven therein, said auxiliary hub having an integral crank pin and an opening adjacent the crank pin for an axle, said opening being at the centre of the wheel; and an axle in said opening.

HARRY GLAENZER.